United States Patent Office 2,693,263
Patented Nov. 2, 1954

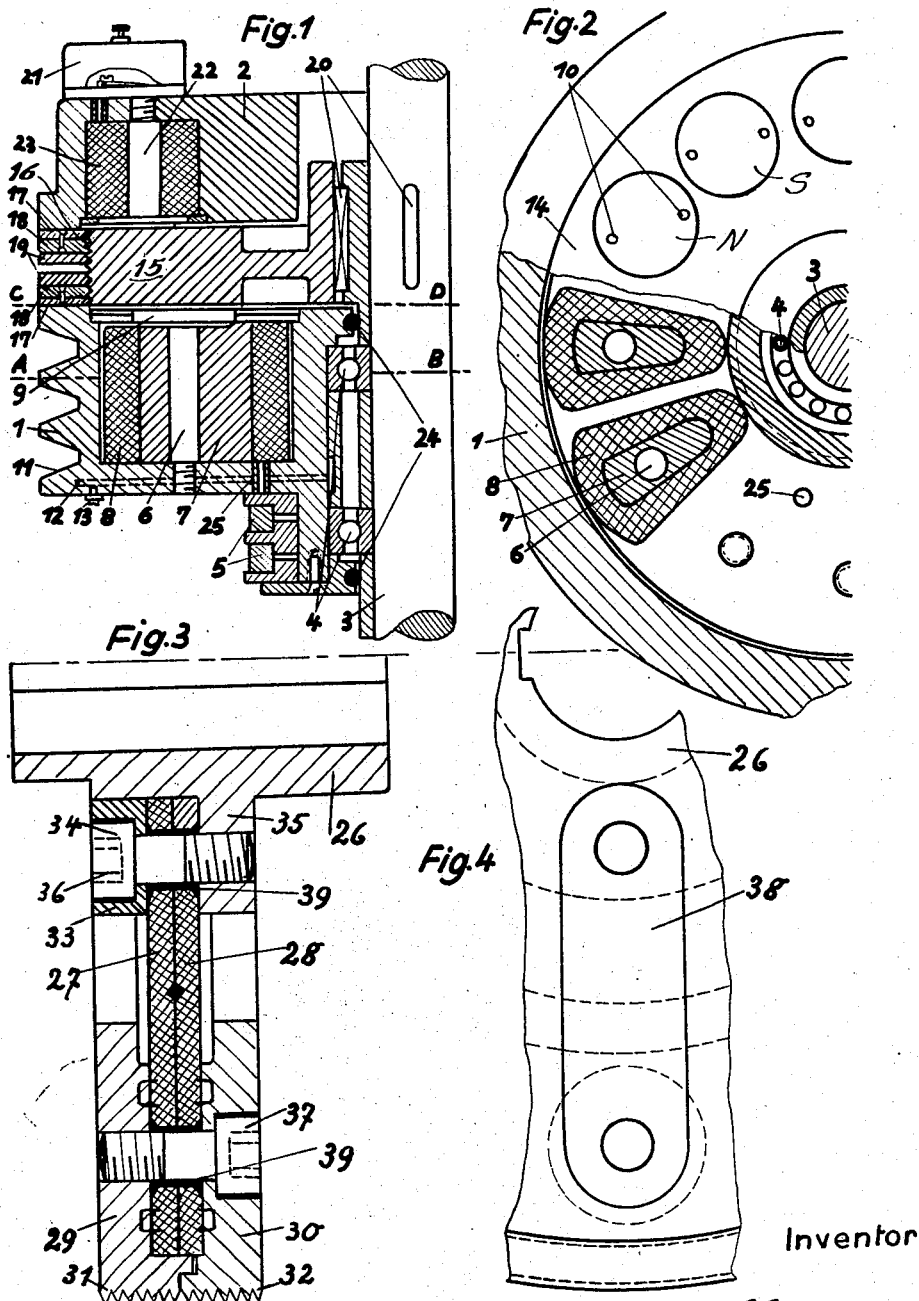

2,693,263

ELECTROMAGNETIC COUPLING OR BRAKE

Hermann Becking, Altona, Germany

Application November 10, 1950, Serial No. 194,965

Claims priority, application Germany November 11, 1949

3 Claims. (Cl. 192—84)

This invention relates to electro-magnetically actuated clutches or brakes. Clutches are known in which the electro-magnet consists of an annular coil wound around a shaft on which the different clutch (or brake) parts are arranged. It is possible in this way to put a large number of coils in a small space, and thus to make the electro-magnet comparatively strong. But the field lines of the magnet are closed through the shaft, so that the entire apparatus is magnetic, which causes considerable difficulty.

According to the invention a plurality of electro-magnets, which are wound alternately as north and south poles, are arranged in side-by-side relationship and with respect to a clutch and/or brake part which is moved by the energization of the electro-magnets to apply the brake and/or clutch.

Each individual core of an electro-magnet is open, and will be closed only by the closing of the field lines to the neighboring electro-magnets through the braking or driving members on the one hand or the clutch member on the other hand, while between the clutch member on the one hand and the braking or driving member on the other hand a small air gap is provided. In this way, all other parts of the apparatus remain non-magnetic, so that its field of application for magnetic clutches or brakes is substantially increased. Preferably the electro-magnets are mounted in an open channel or recess of U-shaped cross section in one of the clutch or brake parts, said channel or recess including a wall upon which the cores of the electro-magnets are secured. The clutch or brake parts are made, in known manner, of a special cast iron of good electrical properties. The plane on which the electro-magnets are arranged side by side can also be curved under certain circumstances. It can also be arranged in the form of a band, in case, for example, a reciprocally driven member is to be clutched or braked. Preferably, however, the braking or driving member and the coupling member will be arranged around a common axis, with the poles of the electro-magnets arranged in a plane which is substantially at right angles, or perpendicular to the common axis. In order to be able to mount as many windings as possible in the available space, it is proposed to wind the coils of the individual electro-magnets in the form of a sector of a circle. In case special core parts are provided, these also will have the form of a sector of a circle.

It is intended, according to the invention, to fasten the core of each electro-magnet to the driving or braking member by the use of a threaded bolt passing through the core and having a flat head which faces toward the clutch member and is provided with bored holes for tightening the bolts.

Also, each of the clutch or braking surfaces according to the invention is provided with an adjustable friction facing. For this purpose the clutch or brake member is preferably provided with two screwed rings, one of which, designated below also as a facing ring, carries the friction facing surface, and the other serves as a lock nut for securing the facing ring against movement from its adjusted position.

In general, factory installations are at present provided with an alternating current network. For this reason it is to be recommended, where clutch and/or brake construction in accordance with this invention are applied to machines, or installations, in such locations, that a controlling switch for the brake and/or clutch be provided with a rectifier, to provide the direct current required to actuate the clutch and/or brake. The rectifier can be made of simple and cheap construction, since the current consumption of the electro-magnets is small.

A special advantage of such electro-magnetically operated clutches or brakes resides in the fact that they can be disengaged in the simplest manner, for example, with the use of a potentiometer, and very smoothly and gradually. Since on the other hand a brake or clutch according to the invention is capable of transmitting great forces, this property makes it especially suitable for connection between the motor and a machine employed in the preparation and/or packing of food and confectionery. The possibility of being able to engage the machine very softly and gradually with the use of a clutch according to the invention involves an especial advantage in connection with machines, in which many movements are derived from a common shaft. With the use of the invention, it is possible, in the simplest manner, to stop a machine automatically immediately upon any irregularity occurring.

The invention also provides a combined clutch and brake assembly which, on one hand, is capable of operating as an electro-magnetically actuated clutch and, on the other hand, as an electro-magnetically actuated brake. It is generally assumed that the driving member and/or the braking member carries the electro-magnets, while the clutch member carries the friction facing, if any are provided. But this arrangement could be reversed. Also it is possible to arrange the brake and driving members, instead of the clutch member, at right angles, or perpendicular, to their main direction of movement, in order, in this way to effect the braking or clutching movement.

The current consumption of the brake or clutch is extremely small. For example, for the transmission of an output of an electric motor of 4 kw., a current of 320 ma., with 200 v. voltage, is used.

The possibility of shifting the clutch member on the shaft is obtained by any kind of groove and key connection. The surfaces rubbing against each other must be lubricated, in order to make sure of a continuously satisfactory shifting of the clutch member. It has been found that in many factories, for example, tobacco manufacturing factories, the continuously falling quantities of dust are so great that the friction surfaces of the employed clutches soon become so dirty that shifting becomes impaired. The possibility of a dustproof packing of this shifting part is difficult to realize and also makes the installation more bulky and more expensive.

The disadvantages described are eliminated according to the invention by the fact that the clutch or brake surface of the clutch member is connected with the part taking the clutching or braking force by a disc which acts strongly on both parts and is flexible in the direction of shift in such a way that the shifting movement, for the purpose of clutching or braking, is taken by the disc. This is especially easy to put into effect in an electro-magnetically operated clutch or brake, since the distances through which the movable member has to pass for the purpose of braking or clutching, or for the purpose of releasing this connection, are very small and usually amount to some tenths of a millimeter up to 1 mm. In case the driving or braking member and the clutch member are arranged around a common shaft, it will be advisable to make this flexible disc as an annular disc. Its outer circumference is connected rigidly with the part which carries the friction or clutch surface of the clutch member, while its inner circumference is fastened to a hub member which is rigidly connected with the shaft.

The invention may assume various forms, but it must be remembered that the movable disc must have enough resistance to transmit the force coming from the brake or clutch. The disc may be made of rubber, or of fabric, for example, a linen or cotton fabric. It may be advisable under certain circumstances to add rubber to the fabric. The composition of the disc, therefore, can correspond to that of the discs, which are commonly used in automobiles for the transmission of the power of the engine, as a replacement for the universal joint. For the transmission of great torques and at high speeds, it may be advisable under certain circumstances to stiffen this flexible disc. This is done preferably by strengthening the disc with a leaf spring or with a plurality of leaf springs, which are connected rigidly, on the one hand, with the clutch or braking surface of the machine part and, on the other hand, with the part taking the clutching or braking force. In one form of construction, two flexible discs are used, between which a leaf spring is placed for the purpose of stiffening the disc structure.

Especially when the torque to be transmitted is small, it may be advisable under certain circumstances not to make the disc complete, but to provide it with recesses, or to replace it by an arm.

Preferably the flexible disc is fastened on both sides, that is, both to the clutch or braking surface of the clutch member and also to the part taking the clutching or braking force, with discs running around them being provided for this purpose. It is to be recommended according to the invention that both the outside discs, between which the flexible disc is fastened, should be symmetrical and that both be used for taking friction or clutch facings.

In the accompanying drawings:

Fig. 1 is a longitudinal section through a combined clutch and brake according to the invention.

Fig. 2 is, in part, a section on line A—B of Fig. 1 and, in part, a section on line C—D of Fig. 1.

Fig. 3 is a half section of another construction of clutch member according to the invention, and Fig. 4 is a side view of Fig. 3.

On a shaft 3, which serves, for example, for driving a cigarette machine, according to Figs. 1 and 2, a clutch member 15 is mounted in such a way as to be shiftable axially by the use of a groove and key connection 20 in such a way that it cannot rotate on shaft 3. On one side of this clutch member is arranged a driving member 1, loosely rotatable on shaft 3. In this example of construction, the bearing used is an anti-friction bearing, which, for example is a ball bearing 4. The clutch member 1 is provided with three wedge-shaped grooves 11 in which wedge-shaped belts, operate to drive the member 1.

The ball bearings 4 are sealed from the outside by the sealing rings 24. For the lubrication of the ball bearings with grease there is provided in the clutch body 1 a bore 12, which can be closed by a screwed connection 13. On the other side of the clutch member there is a braking member 2, on a stationary housing, not shown.

The driving member is provided with an annular channel or recess which has a general U-shaped cross section and in which are arranged a plurality of electro-magnet coils 8, which are wound in such a way that north and south poles appear alternately in the direction of rotation. This is indicated in Fig. 2 at N and S. Altogether, there are an even number of coils arranged in closely spaced circular arrangement. In order to be able to fill the channel as completely as possible, the coils have somewhat the form of the sector of a circle and surround an iron core 7, which has a similar cross section. Each iron core is fastened to the driving member by the use of a threaded bolt 6, which has a head 9, arranged as near as possible to the clutch member. In order to be able to service the threaded bolts, bored holes 10 are made in the head 9 in a known manner. After the assembly of the electro-magnets, the annular channel of the clutch body 1 is covered by a disc 14, of aluminum, for example. The current is supplied to the coils through a pair of slip rings 5, and for the passage of the connecting lines, insulated holes 25 are provided in the driving member 1. The braking member 2 is also provided with a series of individual electro-magnets, but arranged as just described but not necessarily having specially shaped cores. The coils 23 have a cross section in the form of the sector of a circle and are fastened by the use of threaded bolts 22 in an annular channel of the braking member 2. The connection terminals of the coils of these electro-magnets of the braking member 2 are designated by 21.

The outer circumference of the clutch member 15 is provided with a thread 16, on which two rings 18 and two rings 19 are screwed. The rings 18 carry friction facings 17, which are turned toward corresponding surfaces of the driving member 1 or of the braking member 2. The threaded rings 19 serve as lock nuts for the facing rings 18, in order to permit adjustment of the facing rings and to enable them to be held locked in adjusted position.

If the coils 8 of the driving member are excited, the clutch member 15 is gradually and smoothly coupled with the driving member 1, to transmit a drive to shaft 3 and start the machine. After shutting-off the current to the coils 8, the brake can be applied by the excitation of the coils 23, which draw the clutch member 15 toward the right against the braking member 2.

Figs. 3 and 4 show another form of construction of the clutch member. According to these figures, there is mounted rigidly on a shaft, which is not shown and which is neither rotatable or shiftable longitudinally, an additional member 26, which is connected by means of a two-part flexible disc 27, 28, with two symmetrical annular discs 29, 30. The two annular discs have on their outer circumferences threads 31, 32 for taking clutch or brake facings. The threads 31 of the annular disc 29 serve, for example, for taking brake facings, while the threads 32 of the annular disc 30 serve for taking the clutch facings.

The flexible discs 27, 28 may be made of fabric, for example, a cord fabric, which is treated with rubber. The inner circumference of these two discs, placed one over the other, is fastened to an annular flange 35 of the additional member 26 by the use of an annular disc 33 and by means of cylindrical cap screws. The heads of the cylindrical cap screws are provided with wrench openings to permit of their actuation.

In order to stiffen the flexible discs 27, 28, especially for heavy torques or high speeds, leaf springs 38 are inserted between the inner screws 34 and the outer screws 37, which at the same time are arranged between the flexible discs 27, 28.

The distance of shift of the clutch member, that is, of the two annular discs 29, 30, from a zero position to both sides, that is, both toward the brake and toward the clutch, amounts to about 0.5 mm. This distance is provided by the flexibility of the discs 27, 28, together with the leaf springs 38, so the additional member 26, as described, can be connected rigidly with the shaft. The difficulty of lubrication of this additional member are completely eliminated.

The thickness of the flexible disc, or discs, is such as makes it certain that the torques will be transmitted at all times, without the tangential lateral springing of the disc becoming too high.

The flexible discs 27, 28 are strengthened in the region of the bored holes through which the cap screws 34, 37 pass, by cylindrical eyes 39 made of sheet metal. By these sheet metal eyes, the discs 27, 28 are, on the one hand, bound together with the leaf springs 38 into a unit, but on the other hand, these sheet metal eyes serve to prevent unnecessary compression of the flexible discs 27, 28 at the places where they are clamped when the cap screws 34, 37 are tightened.

I claim:

1. In an electromagnetic clutch or the like, a rotary shaft, an annular disk of flexible non-metallic non-resilient material, means securing the inner portion of said disk to said shaft, an annular armature fixedly secured to the outer portion of said disk, an annular housing encircling said shaft and having a substantially channel-shaped cross section, said housing and shaft being relatively rotatable, electromagnet means in said housing, and mutually engageable friction surfaces carried by said housing and said armature.

2. The combination according to claim 1, further provided with a plurality of radially extending leaf springs, and means securing said leaf springs between said shaft and said armature.

3. The combination according to claim 1, said electromagnet means comprising a plurality of circumferentially spaced electromagnets.

References Cited in the file of this patent

UNITED STATES PATENTS

| Number | Name | Date |
|---|---|---|
| 880,266 | Ast | Feb. 25, 1908 |
| 1,031,081 | Miram et al. | July 2, 1912 |
| 1,446,225 | Thompson | Feb. 20, 1923 |
| 1,447,390 | Kucharski | Mar. 6, 1923 |
| 1,636,290 | Davey et al. | July 19, 1927 |
| 1,735,648 | Moore et al. | Nov. 12, 1929 |
| 1,946,200 | Easter | Feb. 6, 1934 |
| 2,036,477 | Hodgson | Apr. 7, 1936 |
| 2,098,266 | Walker | Nov. 9, 1937 |

FOREIGN PATENTS

| Number | Country | Date |
|---|---|---|
| 751,427 | France | Sept. 4, 1933 |
| 382,905 | Great Britain | Nov. 3, 1932 |